United States Patent Office 3,490,560
Patented Jan. 20, 1970

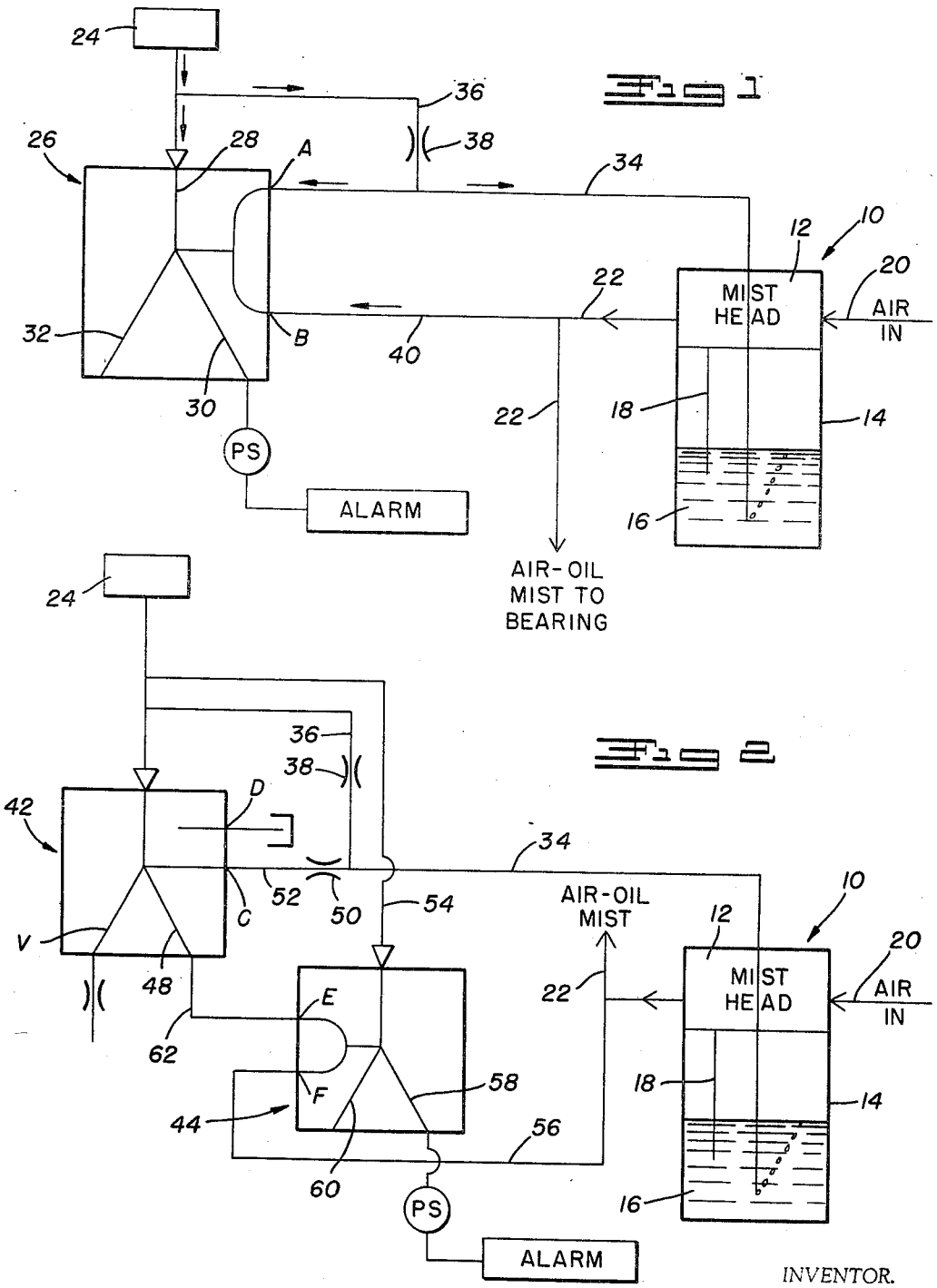

3,490,560
METHOD, SYSTEM AND APPARATUS FOR MONITORING AND CONTROLLING OIL MIST
Lars J. Hierta, Westland, Mich., assignor to Eaton Yale & Towne Inc., Cleveland, Ohio, a corporation of Ohio
Filed Sept. 8, 1967, Ser. No. 666,275
Int. Cl. F01m *1/00;* F16n *29/00;* F17d *3/00*
U.S. Cl. 184—6                     6 Claims

ABSTRACT OF THE DISCLOSURE

A method, system, and apparatus for monitoring and controlling the generation of oil mist for lubrication purposes. A pair of fluidic signals are generated as a function of the oil level in the reservoir of the misting unit and the air pressure at the misting unit outlet. These fluidic signals are fed into an interaction chamber which may take the form of a binary digital device such as an AND gate or the combination of a NOT gate and an AND gate. The fluidic signals thus generated as a function of reservoir oil level and the outlet air pressure act as control signals in the binary digital devices which devices produce an output indicative of the operation of the misting unit. Alarm means such as a pressure switch and audio alarm are responsive to the output of the binary digital devices.

BACKGROUND OF THE INVENTION

This invention relates to a method, system, and apparatus for monitoring and controlling the flow of oil mist from an aerosolization or misting unit to a bearing or other member to be lubricated.

For several years the advantages of oil mist lubricating systems in specific applications have been recognized. A chief advantage of a mist lubricating system is the ability to continuously apply lubricant to a bearing or other surface. Such a continuous application of lubricant is to be differentiated from intermittent lubrication wherein a metered quantity of lubricant is applied on a timed basis.

Because mist lubrication is often used with high cost bearings, reliable monitoring and control of the mist lubrication system is essential. This invention provides a method, system, and apparatus for monitoring and controlling a mist lubrication system. In particular, this invention provides a method, system, and apparatus for monitoring the level of oil in the reservoir of the misting unit as well as the air pressure at the output of the misting unit.

While this invention is not concerned with the particular design of the misting unit employed in order to produce a commercially practicable oil mist aerosol for lubrication purposes, the method, system, and apparatus of this invention are particularly suited to aerosolization or misting units wherein an aerosolization gas under pressure is introduced into a misting head to become mixed with a liquid to thereby produce a mist or aerosol.

The monitoring and control apparatus of this invention is basically a fluidic system wherein the flow of low pressure fluid (gas, liquid, or gas-liquid combinations) through non-moving components is used to do useful control work. The fluidic monitoring and control system of this invention is particularly well suited to oil mist systems inasmuch as the same source of fluid pressure used to produce the mist or aerosol may also be used in the fluidic system as a control media.

Traditionally, monitoring and control of oil mist systems have been based primarily on electronic or electromechanical devices. In many instances electronic monitoring and control of mist systems is considered undesirable because of the combustion hazards involved. Electromechanical monitoring and control systems or pure mechanical control systems have a limited reliability due to the limitations of a plurality of moving parts of the systems. A fluidic control system is nonelectrical in nature and uses non-moving components to do useful control work thus overcoming many of the disadvantages of the prior art.

Reference will now be made to the preferred embodiment of this invention and in particular to FIGURES 1 and 2 thereof wherein:

FIGURE 1 is a schematic representation of the monitoring and control system of this invention, and FIGURE 2 is a schematic representation of the monitoring and control system of this invention in a modified form.

The preferred embodiment of FIGURE 1 of this invention shows a monitoring and control system as utilized in a mist lubrication system. An aerosolization or misting unit 10 is schematically shown in FIGURE 1 including a misting head 12 and a reservoir 14. Within the reservoir 14 there is provided a supply of lubricant 16. A tube 18 provides a passageway for the flow of lubricant from the reservoir to the misting head 12. Air or other suitable aerosolizing fluid enters the misting head at 20 where it is mixed with the lubricant to form an air-oil mist which is in turn conveyed to a bearing or other surface to be lubricated by means of conduit 22 extending from the misting head outlet.

The monitoring and control system of this invention as shown in FIGURE 1 comprises a source of pressurized air 24, a fluidic interaction chamber 26, and associated conduits for interconnecting the air source 24 with the interaction chamber 26 and the misting unit 10.

As shown in the preferred embodiment of FIGURE 1 interaction chamber 26 may take the form of an AND gate. The AND gate is a well-known binary digital device commercially available from many manufacturers. It is characteristic of an AND gate that the output may lock in a first output channel as long as a first and second control are on. Output in the first output channel stops when the first and/or second control are off. As shown in FIGURE 1 an air source 24 directs pressurized fluid into the AND gate 26 at an input channel 28. With a normal signal at control channels A and B, output from the AND gate will be in output channel 30. Channels A and B of FIGURE 1 are directly connected to the misting unit 10 in order to monitor the performance thereof. Channel A is directly connected to conduit 34 leading to the oil reservoir 14. A conduit 36 interconnects conduit 34 with the air source 24. A restrictor 38 is imposed in the conduit 36 for the purpose of reducing pressure of the fluid in the conduit 36 as it enters conduit 34. As shown in FIGURE 1 pressurized fluid from the air source 24 will enter the conduit 34 via conduit 36 and will be directed into control channel A of the AN gate 26 and also the lubricant reservoir 14 where the pressurized fluid will bubble to the surface of the lubricant as is shown schematically. Depending on the depth of lubricant in the reservoir 14, a resistance will thereby be imposed to the flow of pressurized fluid from the line 34 into the reservoir 14. Should the reservoir 14 be completely full a higher resistance will be imposed to the flow of fluid from conduit 34 than if the reservoir should be nearly empty. Thus, the flow of fluid in conduit 34 will be a function of the oil level in the reservoir 16. Similarly, the flow of fluid in control channel A will be a function of the lubricant level in the reservoir 14 inasmuch as the total flow in channel A and conduit 34 must equal the flow in conduit 36. Thus, a fluidic control signal is introduced into the interaction chamber 26 of FIGURE 1 as a function of the level of lubricant in the reservoir 14.

Channel B of FIGURE 1 is interconnected with the air-oil mist line 22 by means of conduit 40. Thus, a fluidic signal is fed into control channel B which is a direct function of the air pressure at the outlet of the misting unit 10. Since the interaction chamber 26 of FIGURE 1 functions to produce an output in the channel 30 with proper fluidic control signals being fed to the control channels A and B, a flow in the output channel 30 will thus serve to indicate a desired level of lubricant in the reservoir 14 as well as a desired air pressure at the misting head outlet. As the level of lubricant in the reservoir 14 decreases, the fluid flow in the control channel A also decreases. Similarly, as the air pressure at the misting head outlet decreases, the fluid flow in the control channel B also decreases. With proper calibration, therefore, a low level of lubricant in the reservoir 14 and/or low air pressure in line 22 will serve to decrease one or both of the control signals in channels A or B to thus switch the output of the interaction chamber from the output channel 30 to the output channel 32. As shown in FIGURE 1, a pressure switch may be interconnected to the output channel 30 in conjunction with an alarm such that a switching from output channel 30 to output channel 32 will close the normally open pressure switch to thereby activate the alarm.

In the preferred embodiment of FIGURE 1 the air source 24 may have a value on the order of 2-5 p.s.i.g. The restrictor 38 may be of such a value as to reduce the pressure in line 36 to 5-10 inches of water at the junction of conduit 36 and conduit 34.

It should be noted that the air source 24 of FIGURE 1 (as connected to the interaction chamber 26) and the air source or inlet 20 to the misting unit 10 may be interconnected to a single air source. Any differences in pressure requirements of the misting head 12 of the misting unit 10 and the interaction chamber 26 may be compensated for by means of a suitable restrictor.

In FIGURE 2 there is shown a modification of the monitoring and control system of FIGURE 1 in order to demonstrate the flexibility of the fluidic control of this invention. Where possible similar reference characters will be used in FIGURE 2 as were used in FIGURE 1. Thus, as is shown in FIGURE 2 a misting unit 10 is comprised of a misting head 12, a reservoir 14, lubricant 16, and a tube 18 to provide a passageway for the flow of lubricant from the reservoir to the misting head. A source of air 20 is provided at the misting head for generating an air-oil mist in conduit 22 leading to a bearing or other surface to be lubricated.

The fluidic monitoring and control system of FIGURE 2 includes an air source 24 and a pair of interaction chambers 42, 44.

Interaction chamber 42 of FIGURE 2 is a converted NOR gate functioning much like a NOT gate. The conversion from a NOR gate to a NOT gate is accomplished by means of a cap covering the control channel D and a restrictor imposed at the output channel V. With a normal fluidic control signal in channel C of FIGURE 2 output flow from the interaction chamber 42 is in output channel 48. In the absence of a predetermined control signal in channel C, the output flow will switch from output channel 48 to output channel V. As in FIGURE 1 the control channel C of FIGURE 2 is interconnected with a conduit 34 leading into the lubricant 16 of reservoir 14. Conduit 34 is interconnected with the air source 24 by means of conduit 36 and restrictor 38. A second restrictor 50 may be imposed in the line 52 between the control channel C and the junction of conduits 34, 36. As in FIGURE 1 the flow of fluid from the source 24 through the line 36 is diverted in conduit 52 and conduit 34. The level of lubricant in the reservoir 14 will provide a resistance to the flow of fluid from the conduit 34. Thus, the flow of fluid in conduit 52 will vary of a function of the level of lubricant in the reservoir 14. The control signal of channel C of the interaction chamber 42 is thus a function of the level of lubricant in the reservoir 14. With proper calibration, a low level of lubricant in reservoir 14 will produce a low fluid signal in conduit 52 and control channel C to thus switch the output of the interaction chamber 42 from output channel 48 to output channel V.

The second interaction chamber 44 of FIGURE 2 may take the form of a standard AND gate. A source of fluid may be introduced into the interaction chamber 44 by means of a conduit 54 interconnected with the air source 24. The function of an AND gate has been described with respect to FIGURE 1. As shown in FIGURE 2 the control channels E, F are linked respectively with the output channel 48 of the interaction chamber 42 and the output of the misting head 12 of the misting unit 10. Thus, the flow from interaction chamber 42 via output channel 48 is fed directly into the control channel E of interaction chamber 44. Similarly, air pressure in conduit 22 is fed into control channel F of interaction chamber 44 by means of conduit 56. Presuming the control signals E, F of interaction chamber 44 are normal, the output flow of interaction chamber 44 will be in output channel 58. If either of the control signals in channels E, F is low (due, for instance, to a low level of lubricant in reservoir 14 or a low air pressure in conduit 22) output from interaction chamber 44 will switch from output channel 58 to output channel 60. Since a normally open pressure switch is interconnected with output channel 58, a switching to output channel 60 will close said pressure switch and thus activate an alarm.

By comparing FIGURES 1 and 2, it will be seen that whereas in FIGURE 1 the fluidic control signal generated as a function of the lubricant level in the reservoir 14 is introduced directly into control channel A of the interaction chamber 26, the similar fluidic control signal in FIGURE 2 is introduced into interaction chamber 42. The output from fluid output channel 48, FIGURE 2, is fed into interaction chamber 44 to function as a control signal in the control channel E.

As an example of representative pressure levels in FIGURE 2 the air source 24 is of the order of value less than 2 p.s.i.g. The pressure in conduit 62 interconnecting the output channel 48 and the control channel E is of the order of 5-10 inches of water. The pressure in conduit 56 is of the order of 5 inches of water.

The preferred embodiment of FIGURE 1 and the modification of the preferred embodiment of FIGURE 1 as shown in FIGURE 2 have been illustrated to show the application of fluidic monitoring and control of aerosols to oil mist systems. This invention should not be considered as limited to the structures as shown in FIGURES 1 and 2 as broadly speaking the invention encompasses a method, system, and apparatus of monitoring and controlling the performance of a misting unit wherein fluid signals are generated as a function of both liquid level of the reservoir and outlet air pressure, and said signals are introduced into an interaction chamber wherein a first output flow is generated with normal conditions of liquid level in the reservoir and outlet air pressure with switching of said first output signal to a second output channel with abnormal conditions of liquid level in the reservoir and/or outlet air pressure.

The normally open pressure switch in conjunction with an alarm as shown in FIGURES 1 and 2 is one of many means for sensing switching of output of an interaction chamber from a first output channel to a second output channel. Alternate means could include structure wherein the pressure switch is inserted in the channel reserved for flow of output fluid under abnormal conditions of oil level in the reservoir and/or outlet air pressure such as channel 32, FIGURE 1.

While this invention has been described with respect to the generation of an air-oil mist wherein air is used as an aerosolizing fluid and oil or other suitable lubricant is aerosolized, this invention is applicable to any system in which aerosolized particles are generated. Other uses of aerosols include the following:

(a) spray drying of chemicals and food products,
(b) the coating of farm products with liquids,
(c) fuel nozzles for combustion chambers,
(d) the coating of solders and tinning agents upon metals,
(e) application of medication,
(f) the coating of metals with anti-corrosive agents,
(g) the application of water resistant coatings,
(h) the coating of a wide variety of materials with insecticides and/or fungicides,
(i) the finishing of a wide variety of fabrics with a wide variety of treating agents,
(j) the deposition of polishes and/or pigments upon a wide variety of material,
(k) humidifiers.

The monitoring and control system of this invention should be considered equally applicable to the above-mentioned aerosol systems.

Having described a method, system, and apparauts for monitoring and controlling air-oil mist, I claim:

1. A method of monitoring and controlling the performance of an aerosolization unit wherein a liquid from a reservoir is aerosolized into finely divided particles by an aerosolizing gas, comprising the step of:
   (a) generating a fluid signal as a function of either liquid level of the reservoir of the aerosolization unit or pressure at the aerosolization outlet,
   (b) introducing said fluid signal into an interaction chamber, wherein a first output fluid signal will be generated with normal conditions of either liquid level or outlet pressure and at least one second output fluid signal will be generated with abnormal conditions of liquid level and/or outlet pressure,
   (c) recording pressure of one of said output flows to thereby indicate satisfactory liquid level in the reservoir and/or outlet pressure.

2. A monitoring and control system for an aerosolization unit wherein a liquid from a reservoir is aerosolized into finely divided particles by an aerosolizing gas, said system comprising:
   (a) a source of pressurized fluid,
   (b) an interaction chamber for receiving and confining a fluid from said source, said chamber comprising:
      (i) a power stream input channel for transmitting said pressurized fluid,
      (ii) a first output channel for normally receiving said pressurized fluid emerging from said power stream input channel,
      (iii) a second output channel,
      (iv) a control signal input channel coupled to said aerosolization unit and said interaction chamber for receiving a fluid signal generated as a function of either liquid level of the reservoir of the aerosolization unit or unit outlet pressure, said control signal channel for deflecting said fluid emitted from said power stream input channel from said first output channel into said second output channel in response to a predetermined fluid signal.

3. The monitoring and control system of claim 2 in which said interaction chamber is further defined as a converted NOR gate having one control channel capped and a restrictor at one output.

4. The monitoring and control system of claim 2 in which said interaction chamber is further defined as a NOT gate.

5. A monitoring and control system for an aerosolization unit wherein a liquid from a reservoir is aerosolized into finely divided particles by an aerosolizing gas, said system comprising:
   (a) a source of pressurized fluid,
   (b) an AND gate for receiving and confining fluid flow from said source, said AND gate comprising:
      (i) a power stream input channel,
      (ii) a first output channel for normally receiving a power stream emerging from said power stream input channel in the absence of a control signal,
      (iii) a second output channel,
      (iv) a pair of control signal input channels responsive to fluid signals generated as a function of liquid level of the reservoir and unit outlet pressure for deflecting a power stream emerging from said power stream input channel into said second output channel.

6. A monitoring and control system for an oil mist lubrication system wherein oil from a reservoir is misted into finely divided particles by compressed air in a misting unit, said monitoring system comprising:
   (a) a source of pressurized fluid,
   (b) a NOT gate for receiving and confining fluid flow from said source, said NOT gate comprising:
      (i) a power stream input channel,
      (ii) a first output channel for normally receiving a power stream emerging from said power stream input channel in the absence of a control signal,
      (iii) a second output channel,
      (iv) a control signal input channel responsive to a fluid signal generated as a function of either liquid lever of the reservoir or unit outlet pressure for deflecting a power stream emerging from said power stream input channel into said second output channel,
   (c) an AND gate for receiving and confining fluid flow from said source, said AND gate comprising:
      (i) a power stream input channel,
      (ii) a first output channel for normally receiving a power stream emerging from said power stream input channel in the absence of control signals,
      (iii) a second output channel,
      (iv) a pair of control signal input channels responsive to a fluid signal generated by said second output channel or said NOT gate and by a fluid signal generated by either unit outlet pressure or liquid level of the reservoir for deflecting a power stream emerging from said power stream input channel of said AND gate into said second output channel,
   (d) alarm means responsive to fluid pressure in said second output channel of said AND gate.

References Cited

UNITED STATES PATENTS

| | | |
|---|---|---|
| 2,072,180 | 3/1937 | Paton. |
| 2,440,883 | 5/1948 | Wiegman. |
| 2,691,428 | 10/1954 | Thomas. |
| 3,358,790 | 12/1967 | Krudewig _____ 137—558 X |

HALL C. COE, Primary Examiner

U.S. Cl. X.R.

137—558